United States Patent
Maeda et al.

(10) Patent No.: US 12,556,639 B2
(45) Date of Patent: Feb. 17, 2026

(54) IMAGE ACQUISITION APPARATUS AND CONTROL METHOD WITH SIGNAL AMPLIFICATION

(71) Applicant: CANON KABUSHIKI KAISHA, Tokyo (JP)

(72) Inventors: Daiki Maeda, Kanagawa (JP); Kimihiko Fukawa, Kanagawa (JP); Takashi Sakai, Kanagawa (JP); Yuichi Yanagiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 18/303,687

(22) Filed: Apr. 20, 2023

(65) Prior Publication Data
US 2023/0353691 A1 Nov. 2, 2023

(30) Foreign Application Priority Data

Apr. 27, 2022 (JP) .................................. 2022-073669

(51) Int. Cl.
*H04N 1/03* (2006.01)
*H04N 1/48* (2006.01)

(52) U.S. Cl.
CPC .............. *H04N 1/03* (2013.01); *H04N 1/486* (2013.01)

(58) Field of Classification Search
None
See application file for complete search history.

(56) References Cited

U.S. PATENT DOCUMENTS

| 9,001,248 | B2 | 4/2015 | Yamanaka et al. | |
| 10,609,316 | B2 | 3/2020 | Kobayashi | |
| 2004/0174576 | A1* | 9/2004 | Kamisuwa | H04N 1/486 348/E3.027 |
| 2015/0281516 | A1* | 10/2015 | Matsui | H04N 1/486 358/474 |
| 2017/0374226 | A1* | 12/2017 | Sano | H04N 1/1931 |
| 2018/0278791 | A1* | 9/2018 | Sano | H04N 1/1937 |

FOREIGN PATENT DOCUMENTS

| JP | H06-204444 A | 7/1994 |
| JP | 2012-044337 A | 3/2012 |
| JP | 2022146492 A | * 10/2022 |

OTHER PUBLICATIONS

Tomii, JP2022146492A English Translation, par 0017, 0023-0029, 0032 (Year: 2022).*

* cited by examiner

*Primary Examiner* — Miya J Cato
(74) *Attorney, Agent, or Firm* — Venable LLP (57) ABSTRACT

An image acquisition apparatus comprising pixels each including sub-pixels, the apparatus comprising signal holding units for holding signals from the sub-pixels, and a signal processing unit for acquiring and processing each of the signals from the signal holding units, wherein the signal processing unit includes a first mode of amplifying, by a predetermined amplification factor, the signals held by the signal holding units and individually outputting the signals, and a second mode of amplifying, by amplification factors at least some of which are different from the amplification factor in the first mode, the signals held by the signal holding units to add and output the signals.

9 Claims, 11 Drawing Sheets

IMAGE ACQUISITION APPARATUS AND CONTROL METHOD WITH SIGNAL AMPLIFICATION

BACKGROUND OF THE INVENTION

Field of the Invention

The present invention mainly relates to an image acquisition apparatus.

Description of the Related Art

Japanese Patent Laid-Open No. 6-204444 describes the arrangement of an image acquisition apparatus that acquires data of a color image by individually detecting light beams of different frequencies in a visible light region, such as red light, green light, and blue light.

Some image acquisition apparatuses are required to acquire an image in two or more operation modes, and a technique capable of implementing such image acquisition by a relatively simple arrangement can generally be required.

SUMMARY OF THE INVENTION

The present invention implements various image acquisition operations by a relatively simple arrangement.

One of the aspects of the present invention provides an image acquisition apparatus including a plurality of pixels, each of which includes a plurality of sub-pixels configured to detect different light beams, the apparatus comprising a plurality of signal holding units configured to hold a plurality of signals output from the plurality of sub-pixels, respectively, and a signal processing unit configured to acquire and process each of the plurality of signals from the plurality of signal holding units, wherein the signal processing unit includes, as operation modes, a first mode of amplifying, by a predetermined amplification factor, the plurality of signals respectively held by the plurality of signal holding units, and individually outputting the plurality of signals, and a second mode of amplifying, by amplification factors at least some of which are different from the amplification factor in the first mode, the plurality of signals respectively held by the plurality of signal holding units, and adding and outputting the plurality of signals.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1:
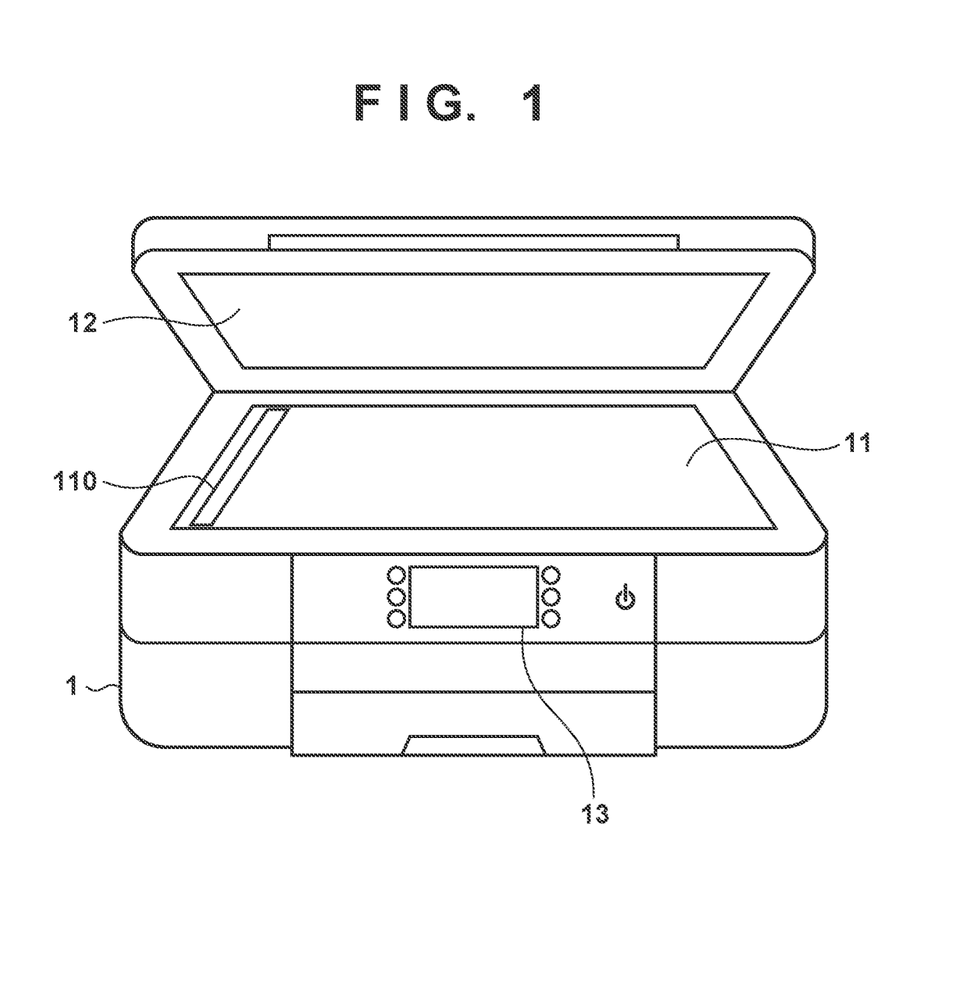
FIG. 1 is a schematic view of an image acquisition apparatus according to an embodiment.

FIG. 1 is a schematic view of an image acquisition apparatus 1 according to an embodiment. The image acquisition apparatus 1 includes a document table 11, a document cover 12, and an operation panel 13. The document table 11 includes a light-transmitting plate material such as a glass plate, and an image sensor 110 and a light source (for example, a Light Emitting Diode (LED)) (not shown) which are arranged below the plate material. The document cover 12 is provided above the document table 11 to be opened/closed with respect to the main body of the image acquisition apparatus 1. The operation panel 13 is provided on the front surface portion of the main body of the image acquisition apparatus 1. A touch panel display can typically be used as the operation panel 13 but an operation input unit such as a switch type and a display unit such as a liquid crystal panel may be provided individually.

The user can open the document cover 12 to place a document as an image reading target on the document table 11. Assume that the document is typically a paper material, and an image (a character, a graphic, a photo, or the like) is formed on the surface of the document. After placing the document on the document table 11, the user can close the document cover 12, and perform an image acquisition operation input via the operation panel 13. In response to the operation input, the image sensor 110 is scanned in a predetermined direction while detecting reflected light from the document irradiated by the light source, thereby acquiring an image signal representing the image of the document.

The thus acquired image signal can be processed as image data by a processor (not shown), and saved in a predetermined memory. The image acquisition apparatus 1 may be called an image reading apparatus, a scanner, or the like but may auxiliarily have an image acquisition function. For example, the image acquisition apparatus 1 may be a printer (so-called multi-function printer) having, as a main function, a print function that can be implemented by a printhead, and having the image acquisition function as an auxiliary function.

Figure 2:
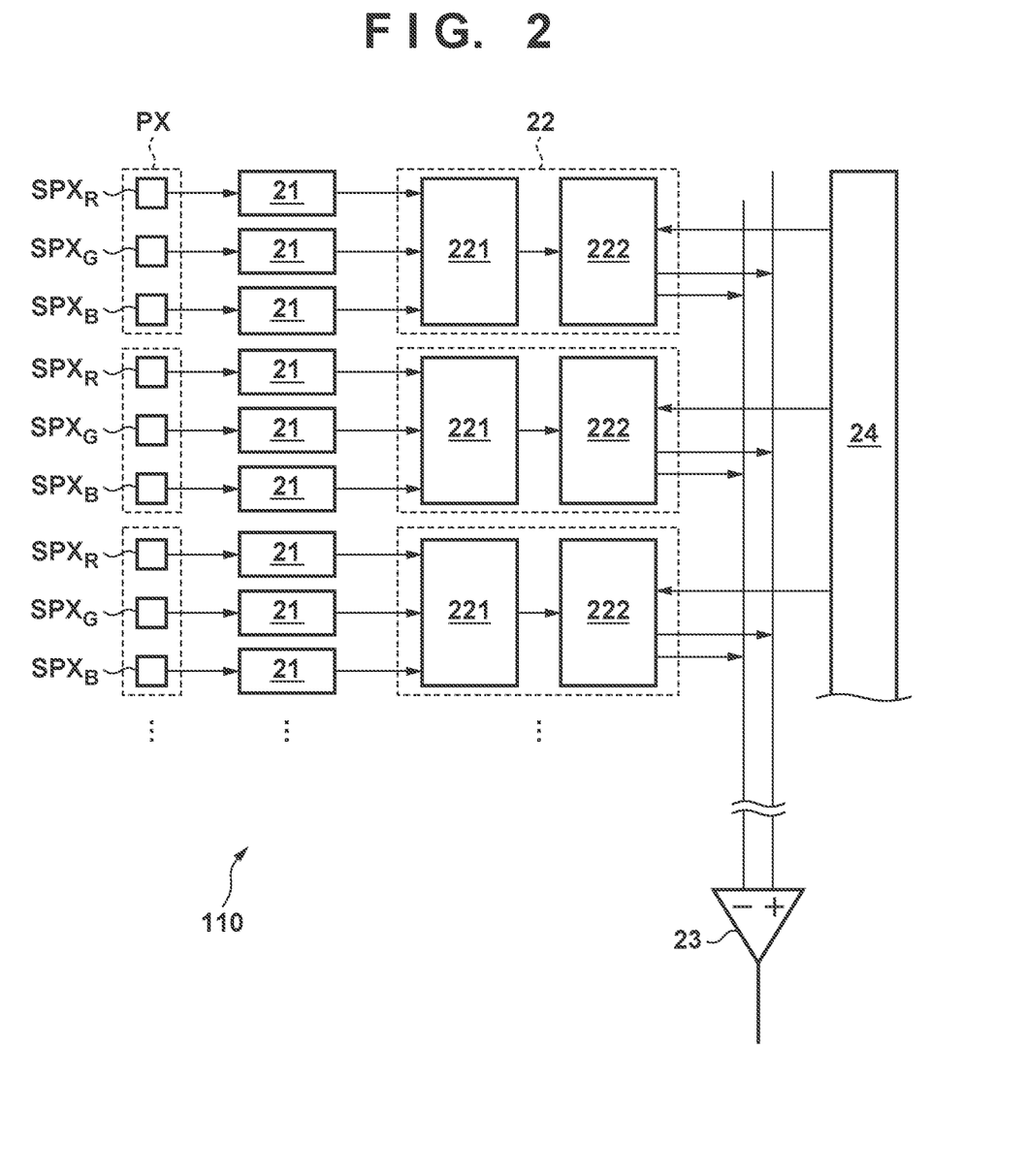
FIG. 2 is a view showing an example of the arrangement of an image sensor.

FIG. 2 shows an example of the arrangement of the image sensor 110. The image sensor 110 includes pixels PX, signal holding units 21, and signal processing units 22. The plurality of pixels PX are arrayed. This embodiment assumes that the plurality of pixels PX are arrayed in one direction (in this example, a direction substantially orthogonal to the scanning direction of the image sensor 110). Each pixel PX includes a plurality of sub-pixels that can detect different light beams. This embodiment assumes that a red pixel $SPX_R$, a green pixel $SPX_G$, and a blue pixel $SPX_B$ are included as the sub-pixels. The red pixel $SPX_R$ can detect red light, the green pixel $SPX_G$ can detect green light, and the blue pixel $SPX_B$ can detect blue light.

In the following description, if it is unnecessary to particularly discriminate the red pixel $SPX_R$, the green pixel $SPX_G$, and the blue pixel $SPX_B$, they are simply represented as sub-pixels SPX (or sub-pixels $SPX_R$, $SPX_G$, and $SPX_B$). Note that each pixel PX need only be configured to individually detect light beams of different frequencies. That is, the kinds of sub-pixels SPX are not limited to this example, and four or more kinds of sub-pixels may be included.

Figure 3:
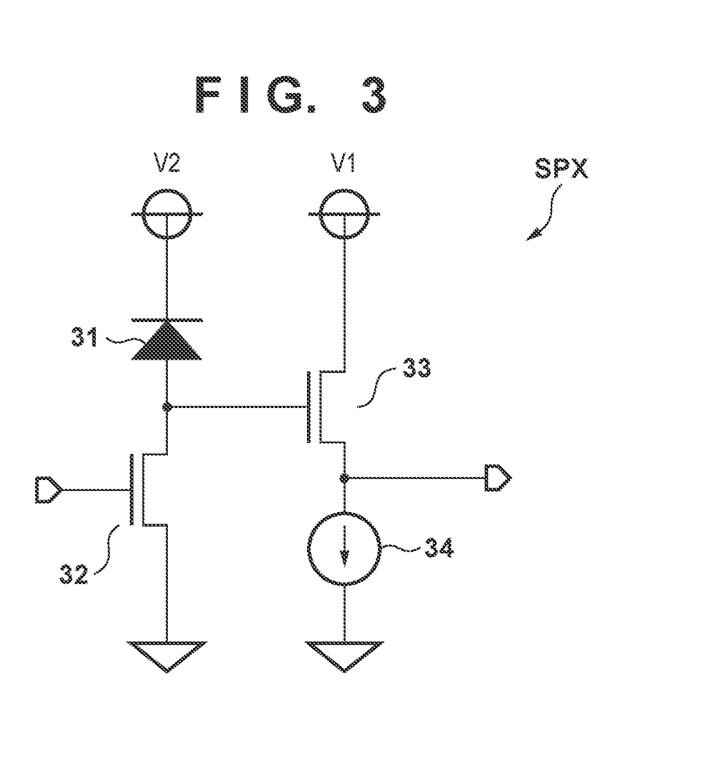
FIG. 3 is a circuit diagram showing an example of the arrangement of a sub-pixel.

FIG. 3 shows an example of the arrangement of the single sub-pixel SPX. The sub-pixel SPX includes a photoelectric conversion element 31, a reset transistor 32, an amplification transistor 33, and a current source 34.

A photodiode is typically used as the photoelectric conversion element 31, and a color filter is provided above the photodiode. As the color filter, a red filter is provided for the red pixel $SPX_R$, a green filter is provided for the green pixel $SPX_G$, and a blue filter is provided for the blue pixel $SPX_B$. The photoelectric conversion element 31 performs photoelectric conversion for light corresponding to the color filter, that is, converts light having passed through the color filter into an electrical signal.

The reset transistor 32 is used to initialize the photoelectric conversion element 31. The amplification transistor 33 is connected to the current source 34 to perform a source follower operation, thereby amplifying a signal from the photoelectric conversion element 31 and outputting the signal as a pixel signal. Note that Metal Oxide Semiconductor (MOS) transistors can typically be used as the reset transistor 32, the amplification transistor 33, and the current source 34 but other elements may be used.

Referring back to FIG. 2, in this embodiment, the plurality of pixels PX form a line sensor by sequentially arraying the red pixels $SPX_R$, the green pixels $SPX_G$, and the blue pixels $SPX_B$ in one direction. As another embodiment, the plurality of pixels PX may form an area sensor by arranging the red pixels $SPX_R$, the green pixels $SPX_G$, and the blue pixels $SPX_B$ in an array. That is, a concept of the image sensor 110 can include a line sensor and an area sensor.

Note that a power supply voltage V1 shown in FIG. 3 or the like is set to a suitable value such as 5 V (volts) in accordance with the circuit arrangement.

Figure 4:
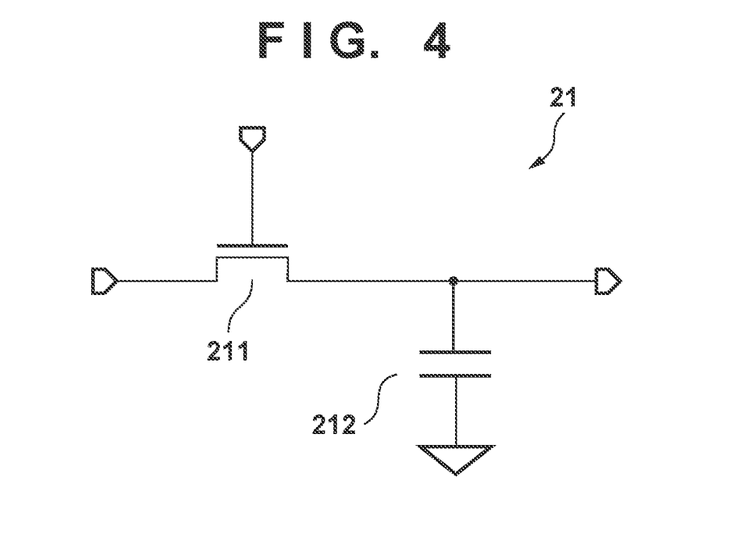
FIG. 4 is a circuit diagram showing an example of the arrangement of a signal holding unit.

FIG. 4 shows an example of the arrangement of the signal holding unit 21. The plurality of signal holding units 21 are provided in correspondence with the plurality of sub-pixels SPX (see FIG. 2), and each signal holding unit 21 includes a sampling circuit that samples the pixel signal output from the corresponding sub-pixel SPX. That is, each signal holding unit 21 includes a switch element 211 and a capacitor 212, and holds the pixel signal output from the corresponding sub-pixel SPX in the capacitor 212 by controlling the switch element 211.

Note that the signal holding unit 21 may be formed as part of the sub-pixel SPX, and the plurality of sub-pixels SPX are uniformly arrayed in the same layout.

Figure 5A:
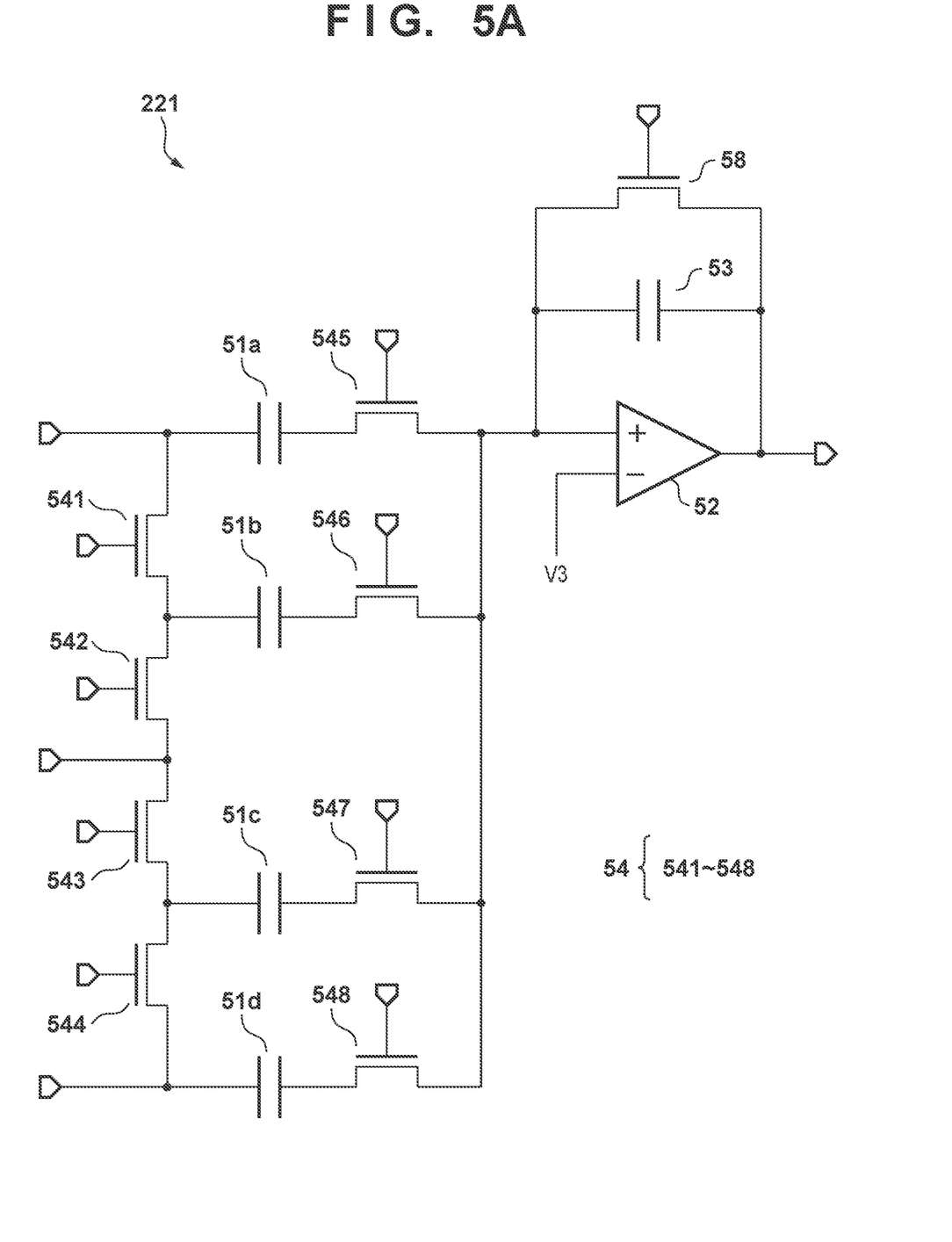
FIG. 5A is a circuit diagram showing an example of the arrangement of a signal processing unit.
Figure 5B:
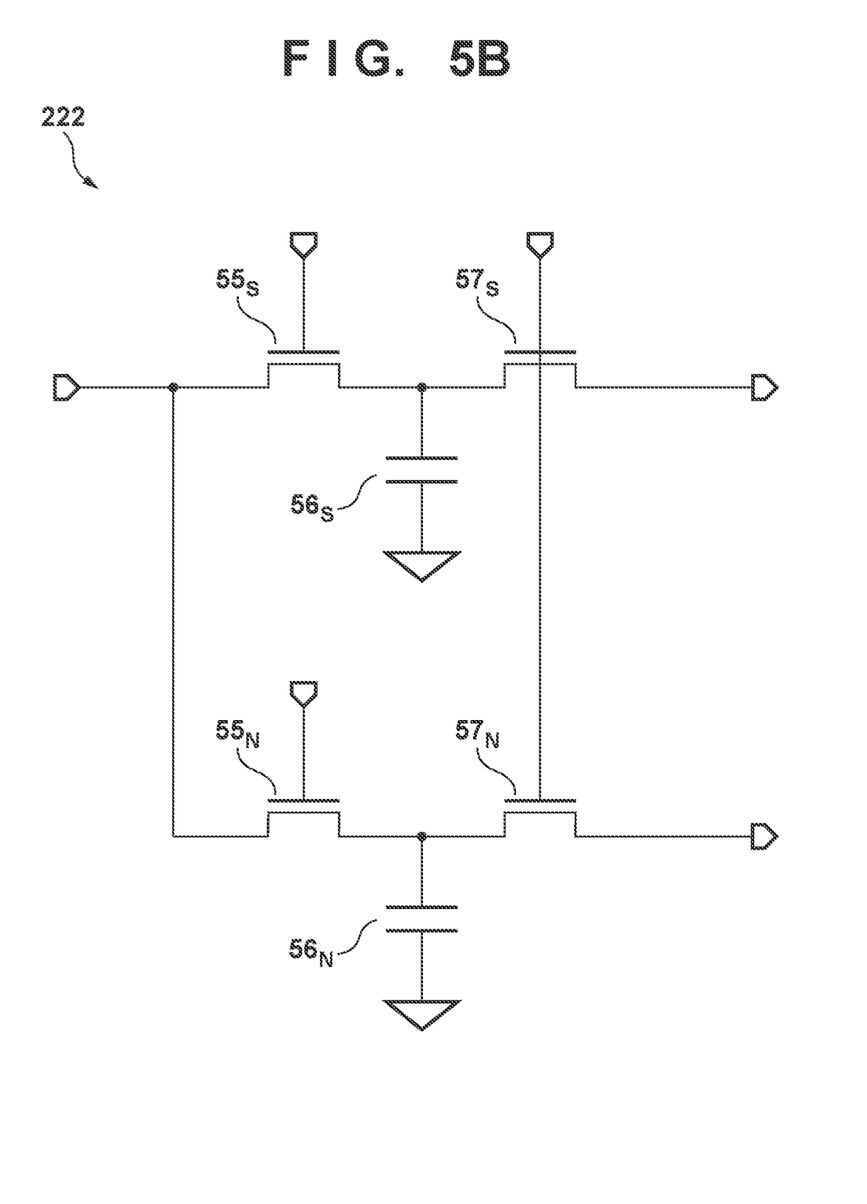
FIG. 5B is a circuit diagram showing an example of the arrangement of the signal processing unit.

FIGS. 5A and 5B each show an example of the arrangement of the signal processing unit 22. The plurality of signal processing units 22 are provided in correspondence with the plurality of pixels PX (see FIG. 2), and each signal processing unit 22 includes an amplification unit 221 and an output holding unit 222.

FIG. 5A shows an example of the arrangement of the amplification unit 221. Although details will be described later, the amplification unit 221 includes a plurality of input capacitors 51a to 51d, a signal amplification unit 52, a feedback capacitor 53, and a switching unit 54, thereby making it possible to amplify the image signal received from the signal holding unit 21 by a variable amplification factor.

FIG. 5B shows an example of the arrangement of the output holding unit 222. The output holding unit 222 includes a sampling circuit that samples the image signal received from the amplification unit 221. In this embodiment, the output holding unit 222 includes switch elements $55_S$ and $55_N$ and capacitors $56_S$ and $56_N$.

The switch element $55_S$ and the capacitor $56_S$ sample, as an optical signal (or S signal), the pixel signal output from the sub-pixel SPX by photoelectric conversion of the photoelectric conversion element 31. The switch element $55_N$ and the capacitor $56_N$ sample, as a dark signal (or N signal), the pixel signal output from the sub-pixel SPX in a case where the reset transistor 32 initializes the photoelectric conversion element 31. The optical signal and the dark signal are externally output via output switch elements $57_S$ and $57_N$, respectively, and the difference between the signals is output by a differential amplifier 23 of the succeeding stage, thereby performing correlated double sampling.

Note that the signal holding unit 21 and the output holding unit 222 have names that can be discriminated, but may be represented as the first holding unit 21 and the second holding unit 222, respectively.

Referring back to FIG. 5A, the amplification unit 221 includes the plurality of input capacitors 51a to 51d, the signal amplification unit 52, the feedback capacitor 53, and the switching unit 54. The input capacitors 51a to 51d are arranged between the signal amplification unit 52 and the three signal holding units 21 respectively corresponding to the sub-pixels $SPX_R$, $SPX_G$, and $SPX_B$. In this example, in an electrical path between one of the signal holding units 21 and the signal amplification unit 52, at least two of the input capacitors 51a to 51d are arranged to be connected in parallel.

The feedback capacitor 53 is arranged to connect the output terminal and input terminal of the signal amplification unit 52, and thus the image signal can be amplified by an amplification factor corresponding the input capacitors 51a to 51d and the feedback capacitor 53. Details will be described later. Note that the signal amplification unit 52 can be initialized by a reset transistor 58 that connects the output terminal and input terminal of the signal amplification unit 52.

The switching unit 54 includes a plurality of switch elements 541 to 548 which can individually be controlled in a conductive state or non-conductive state.

The pixel signal held by the signal holding unit 21 of the red pixel $SPX_R$ can be input to the input capacitor 51b via the switch element 541. The pixel signal held by the signal holding unit 21 of the green pixel $SPX_G$ can be input to the input capacitor 51b via the switch element 542, and input to the input capacitor 51c via the switch element 543. Furthermore, the pixel signal held by the signal holding unit 21 of the blue pixel $SPX_B$ can be input to the input capacitor 51c via the switch element 544.

In addition, the pixel signal held by the signal holding unit 21 of the red pixel $SPX_R$ is input to the input capacitor 51a, and can be input to the signal amplification unit 52 via the switch element 545. The pixel signal held by the signal holding unit 21 of the red pixel $SPX_R$ and/or the green pixel $SPX_G$ is input to the input capacitor 51b, and can be input to the signal amplification unit 52 via the switch element 546. The pixel signal held by the signal holding unit 21 of the green pixel $SPX_G$ and/or the blue pixel SPXB is input to the input capacitor 51c, and can be input to the signal amplification unit 52 via the switch element 547. The pixel signal held by the signal holding unit 21 of the blue pixel $SPX_B$ is input to the input capacitor 51d, and can be input to the signal amplification unit 52 via the switch element 548.

With this arrangement, the switching unit 54 can switch the connection form between the signal amplification unit 52 and each of the three signal holding units 21 corresponding to the sub-pixels $SPX_R$, $SPX_G$, and $SPX_B$.

In summary, with the above arrangement, each signal processing unit 22 can receive the image signals of the red pixel $SPX_R$, the green pixel $SPX_G$, and the blue pixel $SPX_B$ from the corresponding signal holding units 21 individually or collectively, and process them.

Referring back to FIG. 2, the image sensor 110 further includes a shift register 24, thereby making it possible to implement synchronous control of the above-described elements.

Figure 6A:
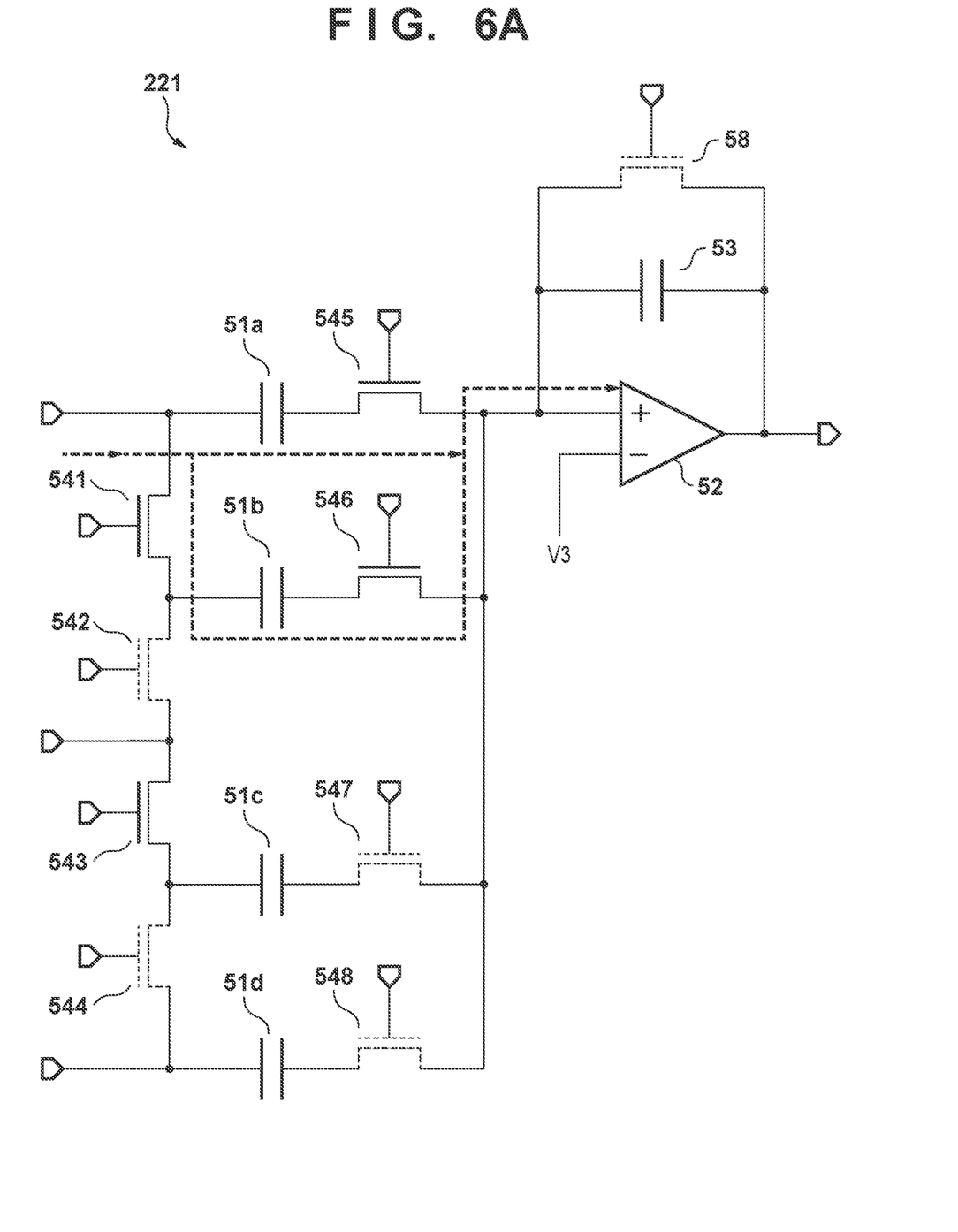
FIG. 6A is a circuit diagram showing an example of the state of a switching unit in a color mode.
Figure 6B:
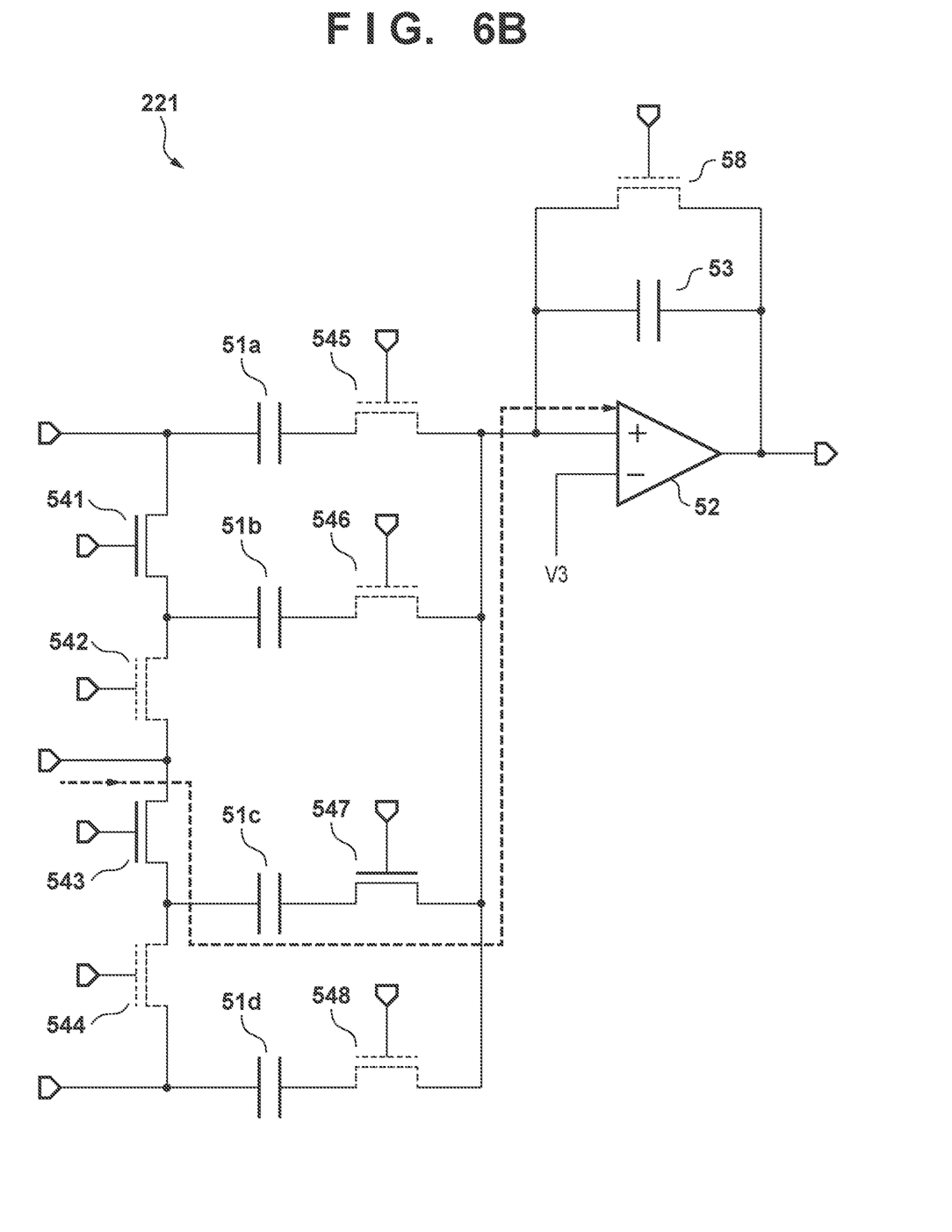
FIG. 6B is a circuit diagram showing an example of the state of the switching unit in the color mode.
Figure 6C:
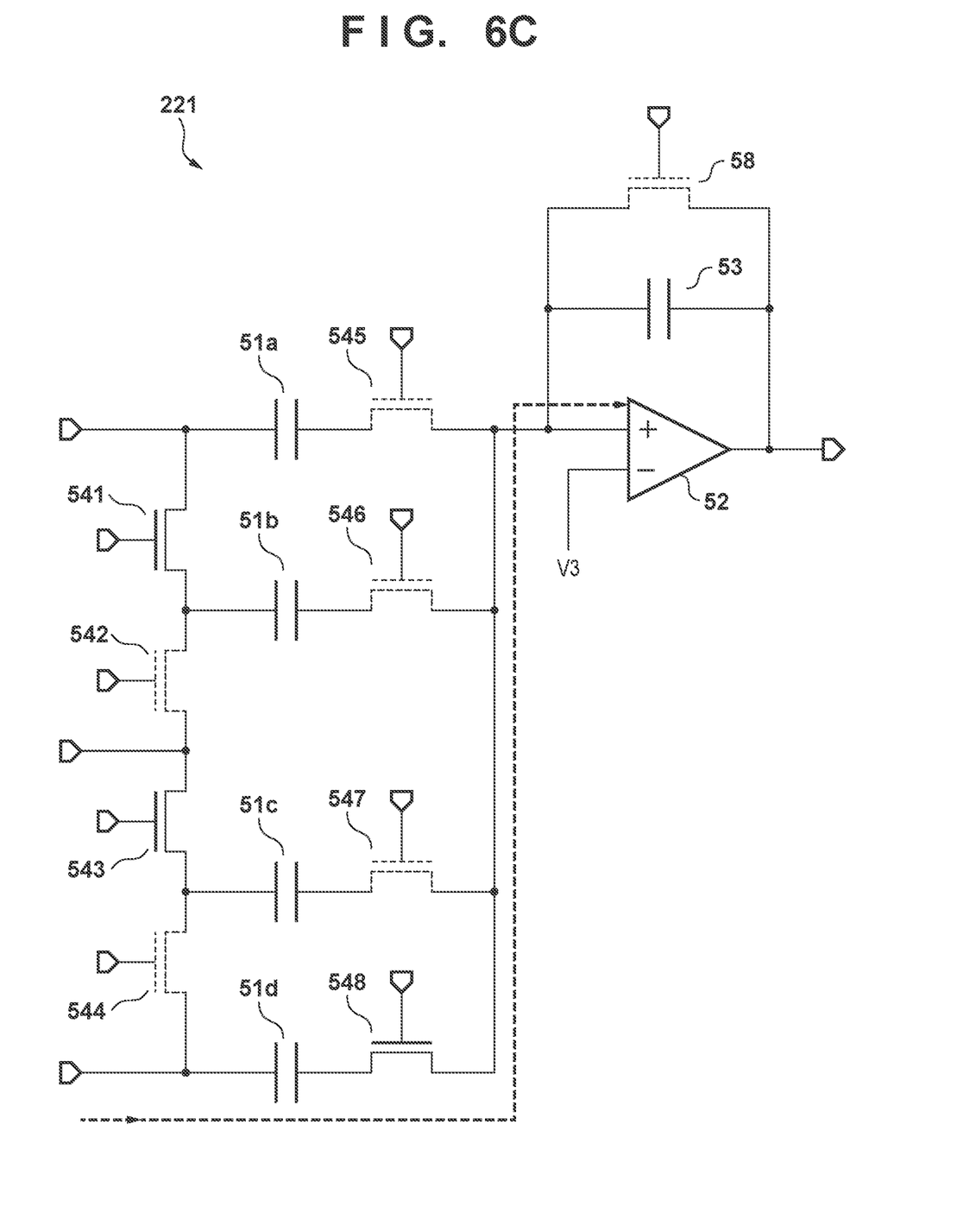
FIG. 6C is a circuit diagram showing an example of the state of the switching unit in the color mode.

FIG. 6A shows the state of the switching unit 54 in a case where the pixel signal of the red pixel $SPX_R$ is processed. FIG. 6B shows the state of the switching unit 54 in a case where the pixel signal of the green pixel $SPX_G$ is processed. FIG. 6C shows the state of the switching unit 54 in a case where the pixel signal of the blue pixel $SPX_B$ is processed. Note that in FIGS. 6A to 6C, elements indicated by broken lines among the plurality of switch elements 541 and the like are in the non-conductive state.

In the example shown in FIG. 6A, since the input capacitors 51a and 51b are active, the pixel signal of the red pixel $SPX_R$ is amplified by an amplification factor corresponding to the ratio between the combined capacitance value of these input capacitors and the capacitance value of the feedback capacitor 53. In the example shown in FIG. 6B, since the input capacitor 51c is active, the pixel signal of the green pixel $SPX_G$ is amplified by an amplification factor corresponding to the ratio between the capacitance value of the input capacitor and that of the feedback capacitor 53. In the example shown in FIG. 6C, since the input capacitor 51d is active, the pixel signal of the blue pixel $SPX_B$ is amplified by an amplification factor corresponding to the ratio between the capacitance value of the input capacitor and that of the feedback capacitor 53.

By sequentially setting the modes shown in FIGS. 6A to 6C in this way, color image data can be acquired. This operation mode is called a color mode (or color scan mode).

Figure 7:
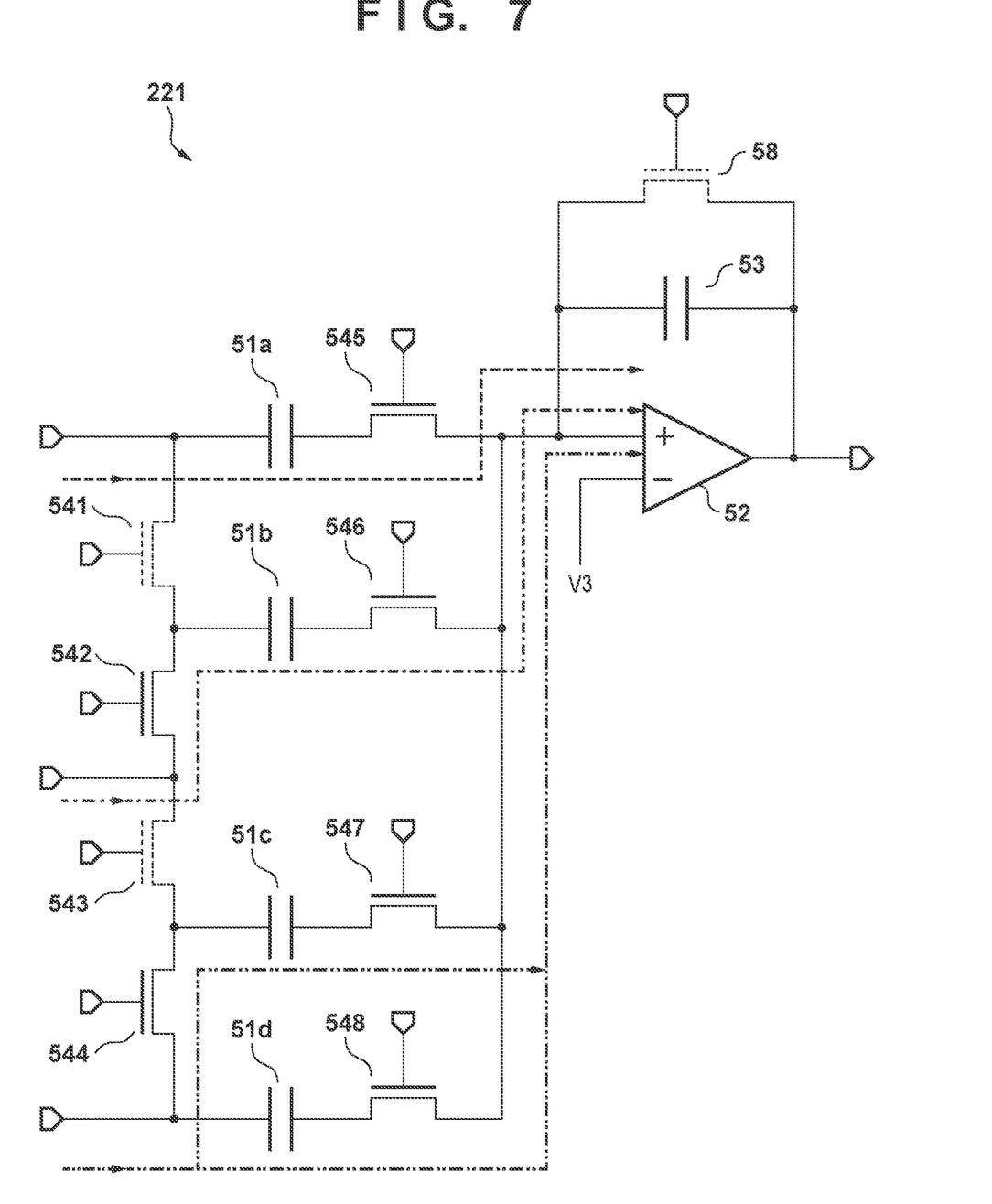
FIG. 7 is a circuit diagram showing an example of the state of the switching unit in a monochrome mode.

FIG. 7 shows the state of the switching unit 54 in a case where the pixel signals of the sub-pixels $SPX_R$, $SPX_G$, and $SPX_B$ are processed, similar to FIGS. 6A to 6C. In this case, all the input capacitors 51a to 51d are active, and for example, the pixel signal of the red pixel $SPX_R$ is amplified by an amplification factor corresponding to the ratio between the capacitance value of the input capacitor 51a and that of the feedback capacitor 53 through a path indicated by a broken arrow. The pixel signal of the green pixel $SPX_G$ is amplified by an amplification factor corresponding to the ratio between the capacitance value of the input capacitor 51b and that of the feedback capacitor 53 through a path indicated by an alternating long and short dashed arrow. Furthermore, the pixel signal of the blue pixel $SPX_B$ is amplified by an amplification factor corresponding to the ratio between the combined capacitance value of the input capacitors 51c and 51d and the capacitance value of the feedback capacitor 53 through a path indicated by an alternating long and two short dashed arrow. Since the switch elements 545 to 548 are in the conductive state, the amplified pixel signals of the sub-pixels $SPX_R$, $SPX_G$, and $SPX_B$ are added.

According to the mode shown in FIG. 7, monochrome image data can be acquired. This operation mode is set as a monochrome mode (or monochrome scan mode).

For example, the capacitance value of the feedback capacitor 53 is represented by $C_{FB}$, the capacitance value of the input capacitor 51a is $2 \times C_{FB}$, the capacitance value of the input capacitor 51b is $1 \times C_{FB}$, the capacitance value of the input capacitor 51c is $3 \times C_{FB}$, and the capacitance value of the input capacitor 51d is $3 \times C_{FB}$. In this case, in the color mode, each of the pixel signals of the sub-pixels $SPX_R$, $SPX_G$, and $SPX_B$ is amplified by an amplification factor of 3 (see FIGS. 6A to 6C). On the other hand, in the monochrome mode, the pixel signal of the red pixel $SPX_R$ is amplified by an amplification factor of 2, the pixel signal of the green pixel $SPX_G$ is amplified by an amplification factor of 1, and the pixel signal of the blue pixel $SPX_B$ is amplified by an amplification factor of 6, and then the pixel signals are added (see FIG. 7).

In summary, when $G_R$ represents the amplification factor of the pixel signal of the red pixel $SPX_R$, $G_G$ represents the amplification factor of the pixel signal of the green pixel $SPX_G$, and $G_B$ represents the amplification factor of the pixel signal of the blue pixel $SPX_B$, $G_R:G_G:G_B=(2+1):3:3=1:1:1$ holds in the color mode. Furthermore, $G_R:G_G:G_B=2:1:(3+3)=2:1:6$ holds in the monochrome mode.

As described above, in accordance with the operation mode, the switching unit 54 switches the connection forms of the plurality of input capacitors 51a to 51d between the plurality of signal holding units 21 and the signal amplification unit 52. In this embodiment, at least two of the input capacitors 51a to 51d are arranged to be connected in parallel in an electrical path between one of the signal holding units 21 and the signal amplification unit 52, and are switched to selectively form an electrical path. Therefore, in accordance with the operation mode, the amplification factor of the pixel signal can be changed without unnecessarily increasing the circuit scale of the amplification unit 221. From this viewpoint, it can be said that the plurality of input capacitors 51a to 51d and the switching unit 54 form an amplification factor variable unit.

Figure 8A:
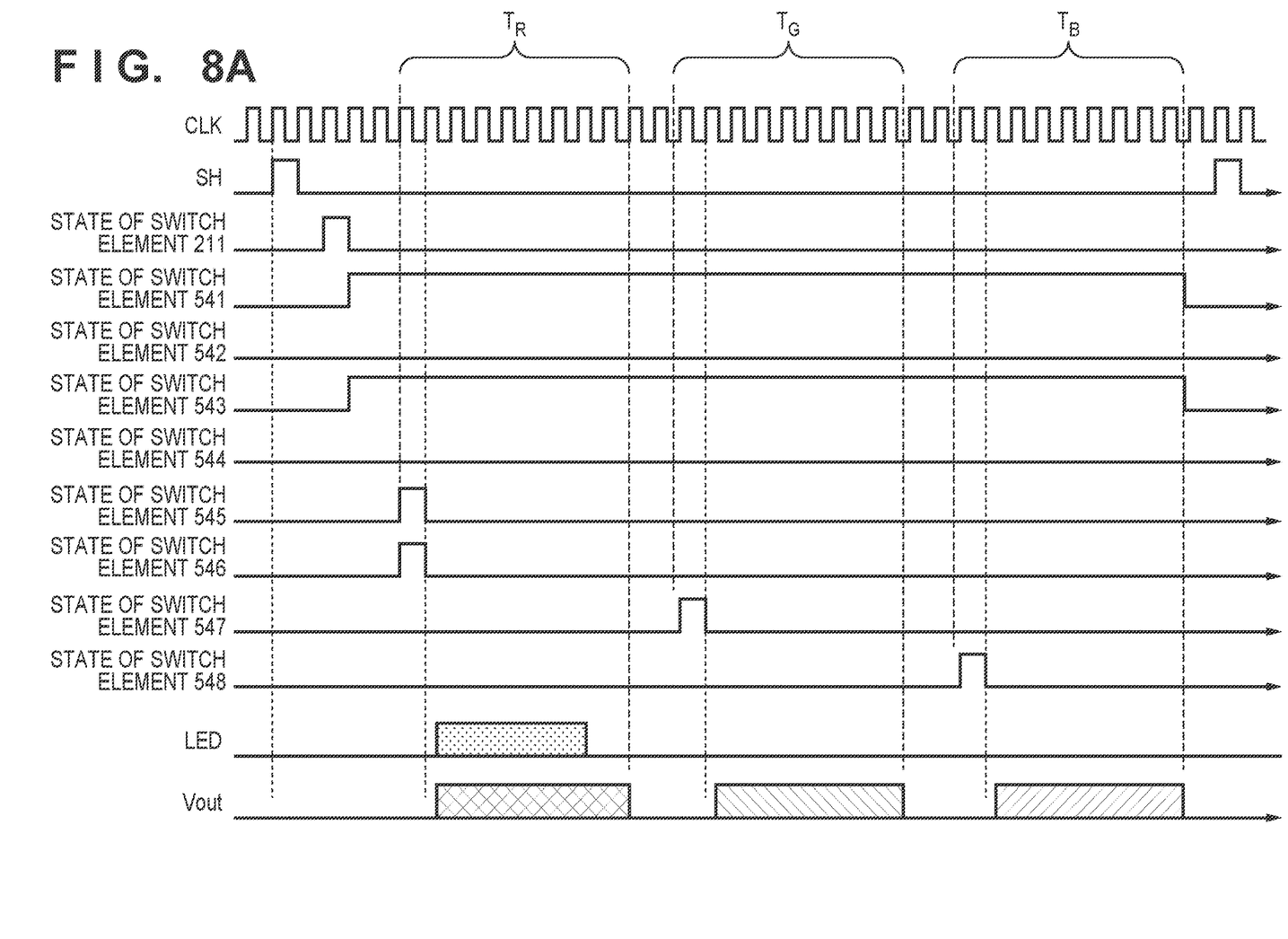
FIG. 8A is a timing chart showing an example of an image acquisition method in the color mode.

FIG. 8A is a timing chart showing an example of a control method for the switch element 541 and the like when acquiring an image in the color mode. The abscissa is a time axis. The ordinate indicates a clock signal CLK, a horizontal synchronization signal SH, the states of the switch element 541 and the like, a state LED of the light source, and an output Vout of the differential amplifier 23. The switch element 541 and the like are in the conductive state during high level (H level), and are in the non-conductive state during low level (L level).

The clock signal CLK is used to perform synchronous control of the respective elements, and, for example, is used by the shift register 24 to generate the horizontal synchronization signal SH. The horizontal synchronization signal SH corresponds to one signal readout operation (signal readout for one line) from the plurality of pixels PX. That is, signal readout for one line is performed for a period from a given H level pulse of the signal SH to a next H level pulse of the signal SH. The state LED of the light source indicates that during H level, the light source is in a light emission state and the document is irradiated. The output Vout indicates that the result of the above-described signal readout is output from the differential amplifier 23 during a period represented by hatching.

In the color mode, a period for reading out the pixel signal of the red pixel $SPX_R$ is represented as a period $T_R$, a period for reading out the pixel signal of the green pixel $SPX_G$ is represented as a period $T_G$, and a period for reading out the pixel signal of the blue pixel $SPX_B$ is represented as a period $T_B$.

In the color mode, the input capacitors 51a and 51b are used to amplify the pixel signal of the red pixel $SPX_R$ (see FIG. 6A). Furthermore, the input capacitor 51c is used to amplify the pixel signal of the green pixel $SPX_G$ (see FIG. 6B), and the input capacitor 51d is used to amplify the pixel signal of the blue pixel $SPX_B$ (see FIG. 6C). Therefore, for the periods $T_R$, $T_G$, and $T_B$, the switch elements 541 and 543 are maintained in the conductive state and the switch elements 542 and 544 are maintained in the non-conductive state.

In the color mode, the pixel signals of the sub-pixels $SPX_R$, $SPX_G$, and $SPX_B$ are individually output. That is, the switch elements 545 and 546 are controlled to the conductive or non-conductive state substantially at the same time, the switch element 547 is controlled at a different timing, and the switch element 548 is also controlled at a different timing.

Note that in the color mode, the pixel signals of the sub-pixels $SPX_R$, $SPX_G$, and $SPX_B$ need only be output individually, and the order of reading out the signals is not limited to this example.

Figure 8B:
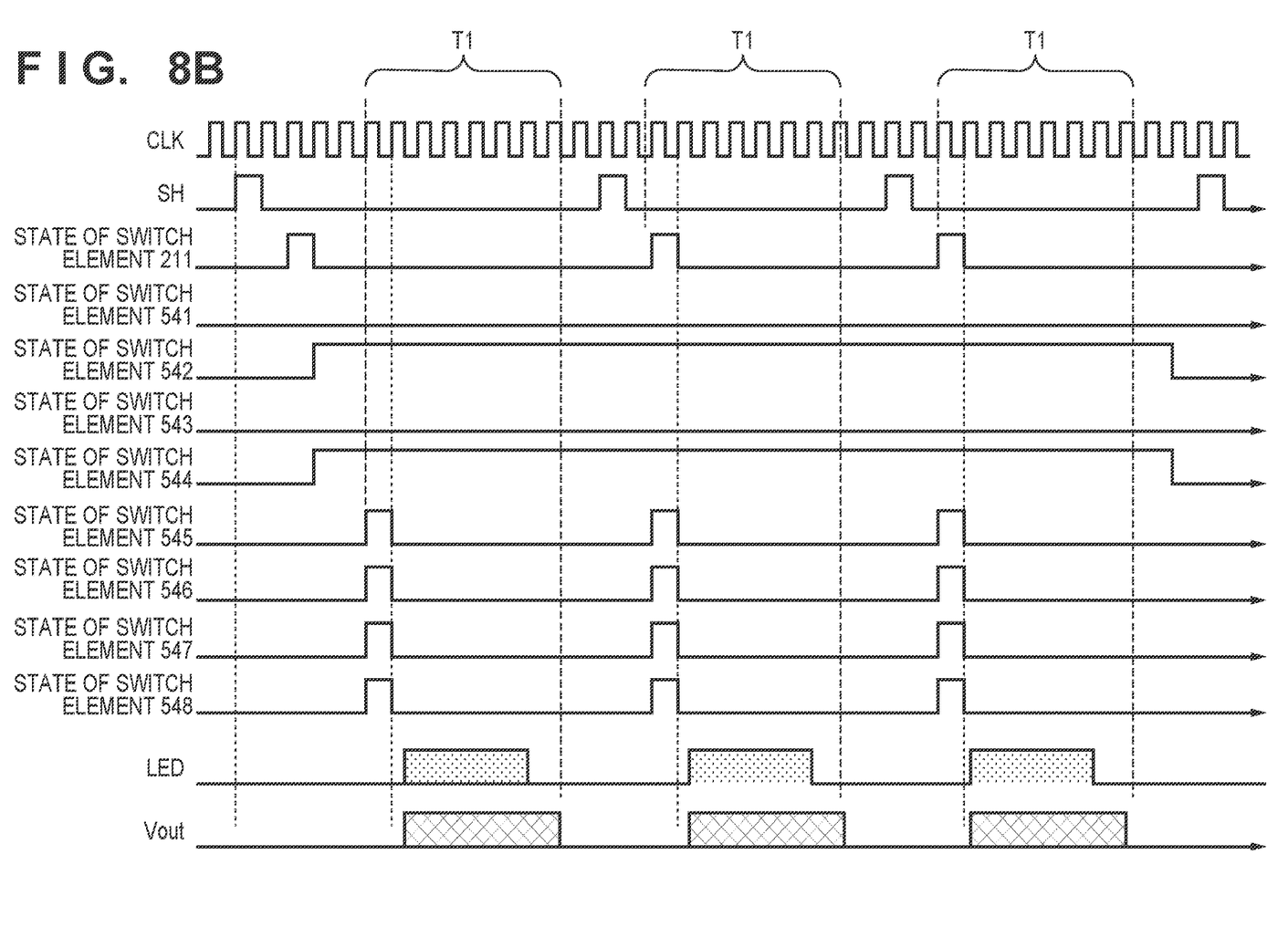
FIG. 8B is a timing chart showing an example of an image acquisition method in the monochrome mode.

FIG. 8B is a timing chart showing an example of a control method for the switch element 541 and the like when acquiring an image in the monochrome mode, similar to FIG. 8A. In the monochrome mode, a period for adding and reading out the pixel signals of the sub-pixels $SPX_R$, $SPX_G$, and $SPX_B$ is represented as a period T1.

In the monochrome mode, the input capacitor 51a is used to amplify the pixel signal of the red pixel $SPX_R$, the input capacitor 51b is used to amplify the pixel signal of the green pixel $SPX_G$, and the input capacitors 51c and 51d are used to amplify the pixel signal of the blue pixel $SPX_B$ (see FIG. 7). Therefore, for the period T1 (for a plurality of periods T1 in a case where signal readout for a plurality of lines is performed), the switch elements 542 and 544 are maintained in the conductive state and the switch elements 541 and 543 are maintained in the non-conductive state.

In the monochrome mode, the pixel signals of the sub-pixels $SPX_R$, $SPX_G$, and $SPX_B$ are added and output. Therefore, the switch elements 545 to 548 are controlled to the conductive or non-conductive state substantially at the same time.

As will be apparent from FIGS. 8A and 8B, the length of each of the periods $T_R$, $T_G$, and $T_B$ is substantially equal to the length of the period T1. Thus, the time taken to acquire the image in the monochrome mode is about ⅓ of the time taken to acquire the image in the color mode. Therefore, this embodiment is also advantageous in speeding up image acquisition in the monochrome mode.

As described above, according to this embodiment, the signal processing unit 22 includes, as the operation modes, the color mode (first mode) in which color image data can be acquired and the monochrome mode (second mode) in which monochrome image data can be acquired. In the color mode, the plurality of pixel signals respectively held by the plurality of signal holding units 21 are amplified by a predetermined amplification factor, and individually output. In the monochrome mode, the plurality of pixel signals respectively held by the plurality of signal holding units 21 are amplified by amplification factors at least some of which are different from the amplification factor in the color mode, and added and output. Since the amplification factor is changed when the switching unit 54 switches the connection forms of the input capacitors 51a to 51d, the circuit scale of the amplification unit 221 is not increased unnecessarily. Therefore, according to this embodiment, various image acquisition operations can be implemented by a relatively simple arrangement.

Note that in this embodiment, the color mode and the monochrome mode are exemplified as the operation modes. However, by changing the number of input capacitors 51a and the like and the number of switch elements 541 and the like, it is possible to implement various operation modes such as a high-speed color scan mode.

In the above explanation, to facilitate understanding, each element is denoted using a name associated with its function. However, the elements are not limited to those having the contents described in the embodiment as their main functions, and may auxiliarily have the functions. Hence, the expression of each element is not strictly limited and can be replaced with a similar expression. To the same effect, the expressions "apparatus" and "unit" may be changeable, may be replaced with "circuit", "structure", "assembly", or the like, or may be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-073669, filed on Apr. 27, 2022, which is hereby incorporated by reference herein in its entirety.

What is claimed is:

1. An image acquisition apparatus including a plurality of pixels, each of which includes a plurality of sub-pixels configured to detect different light beams, the apparatus comprising:
   a plurality of signal holders configured to hold a plurality of signals output from the plurality of sub-pixels, respectively; and
   a signal processor configured to acquire and process each of the plurality of signals from the plurality of signal holders,
   wherein the signal processor includes, as operation modes:
   a first mode of amplifying, by a predetermined amplification factor, the plurality of signals respectively held by the plurality of signal holding units, and individually outputting the plurality of signals, the first mode being a color mode, and
   a second mode of amplifying, by amplification factors at least some of which are different from the amplification factor in the first mode, the plurality of signals respectively held by the plurality of signal holders, and adding and outputting the plurality of signals, the second mode being a monochrome mode,
   each pixel includes, as the plurality of sub-pixels:
   a red pixel configured to detect red light,
   a green pixel configured to detect green light, and
   a blue pixel configured to detect blue light, and
   in a case where $G_R$ represents an amplification factor of a signal of the red pixel, $G_G$ represents an amplification factor of a signal of the green pixel, and GB represents an amplification factor of a signal of the blue pixel:
   $G_R$: $G_G$: $G_B$=1:1:1 holds in the color mode, and
   $G_R$: $G_G$: $G_B$=2:1:6 holds in the monochrome mode.

2. The apparatus according to claim 1, wherein the signal processor includes:
   a signal amplification unit, and
   a switcher configured to switch, in accordance with the operation mode, a connection form between the signal amplification unit and each of the plurality of signal holders.

3. The apparatus according to claim 2, wherein the signal processor further includes:
   a feedback capacitor connected to the signal amplification unit, and
   a plurality of input capacitors arranged between the plurality of signal holding units and the signal amplification unit, and
   the switching unit switches, in accordance with the operation mode, connection forms of the plurality of input capacitors between the plurality of signal holding units and the signal amplification unit.

4. The apparatus according to claim 3, wherein the switching unit includes a plurality of switch elements.

5. The apparatus according to claim 4, wherein at least two of the plurality of input capacitors are arranged to be connected in parallel in an electrical path between one of the signal holders and the signal amplification unit.

6. The apparatus according to claim 5, wherein the plurality of switch elements are controlled so that at least two of the input capacitors connected in parallel selectively form an electrical path between one of the signal holders and the signal amplification unit.

7. The apparatus according to claim 1, wherein the plurality of pixels form a line sensor by sequentially arraying the red pixel, the green pixel, and the blue pixel.

8. A printer comprising:
   an image acquisition apparatus defined in claim 1; and
   a printhead.

9. A control method for an image acquisition apparatus including a plurality of pixels, each of which includes a plurality of sub-pixels configured to detect different light beams, the method comprising:
   holding a plurality of signals respectively output from the plurality of sub-pixels; and
   acquiring and processing each of the plurality of held signals,
   wherein the acquiring and processing includes, as operation modes:
      a first mode of individually outputting the plurality of held signals by amplifying the plurality of held signals by a predetermined amplification factor, the first mode being a color mode, and
      a second mode of adding and outputting the plurality of held signals by amplifying the plurality of held signals by amplification factors at least some of which are different from the amplification factor in the individually outputting, the second mode being a monochrome mode,
   each pixel includes, as the plurality of sub-pixels:
      a red pixel configured to detect red light,
      a green pixel configured to detect green light, and
      a blue pixel configured to detect blue light, and
   in a case where $G_R$ represents an amplification factor of a signal of the red pixel, $G_G$ represents an amplification factor of a signal of the green pixel, and $G_B$ represents an amplification factor of a signal of the blue pixel:
      $G_R$: $G_G$: $G_B$=1:1:1 holds in the color mode, and
      $G_R$: $G_G$: $G_B$=2:1:6 holds in the monochrome mode.

* * * * *